US012561750B2

(12) United States Patent
Mula et al.

(10) Patent No.: US 12,561,750 B2
(45) Date of Patent: Feb. 24, 2026

(54) BARMASTER DRINK DELIVERY SYSTEM

(71) Applicants: Paul Salvatore Mula, San Jose, CA (US); Scott C Harris, Rancho Santa Fe, CA (US)

(72) Inventors: Paul Salvatore Mula, San Jose, CA (US); Scott C Harris, Rancho Santa Fe, CA (US)

( * ) Notice: Subject to any disclaimer, the term of this patent is extended or adjusted under 35 U.S.C. 154(b) by 0 days.

(21) Appl. No.: 18/488,765

(22) Filed: Oct. 17, 2023

(65) Prior Publication Data

US 2025/0124489 A1 Apr. 17, 2025

(51) Int. Cl.
G06Q 50/12 (2012.01)
G06Q 10/087 (2023.01)

(52) U.S. Cl.
CPC ........... G06Q 50/12 (2013.01); G06Q 10/087 (2013.01)

(58) Field of Classification Search
CPC ... G06Q 30/0635; G06Q 10/087; G06Q 50/12
See application file for complete search history.

(56) References Cited

U.S. PATENT DOCUMENTS

| | | | |
|---|---|---|---|
| 2,503,259 A | 4/1950 | Hall | |
| 2,512,050 A | 6/1950 | Ash | |
| 4,961,533 A | 10/1990 | Teller | |
| 5,603,430 A | 2/1997 | Loehrke | |
| 5,837,944 A | 11/1998 | Herot | |
| 6,450,406 B2 | 9/2002 | Brown | |
| 8,954,347 B1 | 2/2015 | Einfalt | |

| | | | |
|---|---|---|---|
| 10,121,121 B1 | 11/2018 | De Bonet | |
| 10,223,683 B1 | 3/2019 | Dalia | |
| 11,192,770 B1 | 12/2021 | Volftsun | |
| 11,992,143 B1 | 5/2024 | Carter | |
| 2002/0070861 A1 | 6/2002 | Teller | |
| 2004/0133473 A1 | 7/2004 | Anderson | |
| 2005/0000737 A1 | 1/2005 | Fox | |
| 2006/0238346 A1* | 10/2006 | Teller | G01G 23/3735 |
| | | | 340/572.1 |
| 2007/0228068 A1 | 10/2007 | Schneider | |

(Continued)

FOREIGN PATENT DOCUMENTS

| | | |
|---|---|---|
| AU | 2014269972 B2 | 1/2016 |
| CN | 102084401 B1 | 6/2011 |

(Continued)

OTHER PUBLICATIONS

R. Cohen, G. Fernie and A. R. Fekr, "Contactless Drink Intake Monitoring Using Depth Data," in IEEE Access, vol. 11, pp. 12218-12225, 2023, doi: 10.1109/ACCESS.2023.3241835. (Year: 2023).*

*Primary Examiner* — Jeffrey A. Smith
*Assistant Examiner* — Latasha D Ramphal
(74) *Attorney, Agent, or Firm* — Law Office of Scott C Harris

(57) ABSTRACT

A drink ordering and dispensing system. A drink is ordered, and placed into a database. When drinks or poor, they are associated with the drinks that have been in the database. Once the drink is poured, the weight of the container before and after pouring is used to determine if the drink has been over poured. If the drink is not in the database, then either an exception is established, or at the drink is automatically popped up on the point-of-sale system for a user to pour a server to use the drink.

10 Claims, 3 Drawing Sheets

(56) References Cited

U.S. PATENT DOCUMENTS

| | | | |
|---|---|---|---|
| 2008/0082360 A1 | 4/2008 | Bailey | |
| 2008/0147211 A1* | 6/2008 | Teller | G06Q 30/06 |
| | | | 700/90 |
| 2008/0195251 A1 | 8/2008 | Milner | |
| 2009/0261974 A1* | 10/2009 | Bailey | G06Q 10/087 |
| | | | 340/568.1 |
| 2010/0037985 A1 | 2/2010 | Waters | |
| 2011/0180563 A1 | 7/2011 | Fitchett | |
| 2011/0313871 A1 | 12/2011 | Greenwood | |
| 2012/0261468 A1 | 10/2012 | Hecht | |
| 2014/0163725 A1 | 6/2014 | Wilinski | |
| 2014/0269972 A1 | 9/2014 | Rada | |
| 2014/0351068 A1 | 11/2014 | Renfroe | |
| 2015/0287006 A1 | 10/2015 | Hunter | |
| 2015/0375984 A1 | 12/2015 | Arcand | |
| 2016/0141322 A1 | 5/2016 | Gokingco | |
| 2017/0116589 A1* | 4/2017 | Krishnaiah | G06Q 20/322 |
| 2017/0135519 A1 | 5/2017 | Deng | |
| 2017/0156619 A1 | 6/2017 | Couderc | |
| 2017/0275147 A1 | 9/2017 | Moezidis | |
| 2018/0106580 A1 | 4/2018 | Li | |
| 2018/0247283 A1 | 8/2018 | Milici | |
| 2018/0349848 A1 | 12/2018 | Edwards | |
| 2019/0072424 A1 | 3/2019 | Clément | |
| 2019/0158563 A1 | 5/2019 | O'Connell | |
| 2019/0197466 A1 | 6/2019 | Hand, III | |
| 2019/0213607 A1* | 7/2019 | Eppley | G06F 16/904 |
| 2019/0303864 A1* | 10/2019 | Edwards | G01G 19/4144 |
| 2020/0247661 A1 | 8/2020 | Rao | |
| 2021/0125139 A1 | 4/2021 | Gregory | |
| 2021/0221667 A1 | 7/2021 | Venkatakrishnan | |
| 2021/0253415 A1 | 8/2021 | Nolan | |
| 2021/0374836 A1 | 12/2021 | Bronicki | |
| 2021/0403309 A1 | 12/2021 | Patel | |
| 2022/0051188 A1* | 2/2022 | Stoodley | G06F 16/22 |
| 2022/0230216 A1 | 7/2022 | Buibas | |
| 2023/0124838 A1 | 4/2023 | Groff | |
| 2023/0206290 A1 | 6/2023 | Huang | |
| 2023/0325905 A1 | 10/2023 | Locke | |
| 2024/0070765 A1 | 2/2024 | Yahata | |
| 2024/0241587 A1 | 7/2024 | Lv | |

FOREIGN PATENT DOCUMENTS

| | | |
|---|---|---|
| CN | 113989984 A | 1/2022 |
| CN | 118044704 A | 11/2022 |
| GB | 2369347 A | 5/2002 |
| GB | 2503259 A | 12/2013 |
| GB | 2512050 A | 9/2014 |
| JP | 2018106580 A | 7/2018 |
| JP | 3242453 U | 6/2023 |
| WO | WO-2016141322 A1 | 9/2016 |
| WO | WO-2019158563 A1 | 8/2019 |

* cited by examiner

- 300 — Receive order
- 305 — Order added to list
- 310 — Analyze order matching speed well correct bottle for earliest destination
- 315 — Drink poured with time window or ?
  - No → 316 — Exception
  - Yes ↓
- 320 — Liquor amount proper ?
  - No → 325 — Overpour exception

- 400 — Detect lift/pour
- 402 — Is there a matching order ?
  - Yes → (back to 400)
  - No ↓
- 405 — Find most relevant pos
- 410 — Pop up drink x detected, add to order? Before incident

BARMASTER DRINK DELIVERY SYSTEM

BACKGROUND

Restaurant style point-of-sale systems can take an order from a user in a restaurant, automatically share that order to the food and drink dispensers, e.g., the bartenders and/or the kitchen, and maintain the bill for that order.

Many different systems of this type are known, including handheld systems that wirelessly communicate to another location.

Patent applications, including US 2009 0261974, describe a system that wirelessly monitors inventory in the dispensing of items.

SUMMARY OF THE INVENTION

The inventors recognized that there are a number of drawbacks with the current systems and recognized ways to improve the process of handheld devices beyond those described in previous patent applications.

Embodiments describe a drink dispensing system, that allows purchasing drinks, and following the process after the drink has been purchased to add additional accountability to the system such that it makes it more difficult for employees to pour free drinks and makes it less likely to provide drinks without billing for them.

DETAILED DESCRIPTION

The present application describes a system for monitoring the dispensing of products in a sales establishment, and maintaining sync between items that are dispensed, and the charges that are made for those items.

An embodiment describes monitoring the dispensing of alcoholic drinks. However, it should be understood that this system can be used to can monitor different products in different environments including food, non alcoholic drinks, as well as other items that are sold and dispensed in an environment including a restaurant environment.

Figure 1:
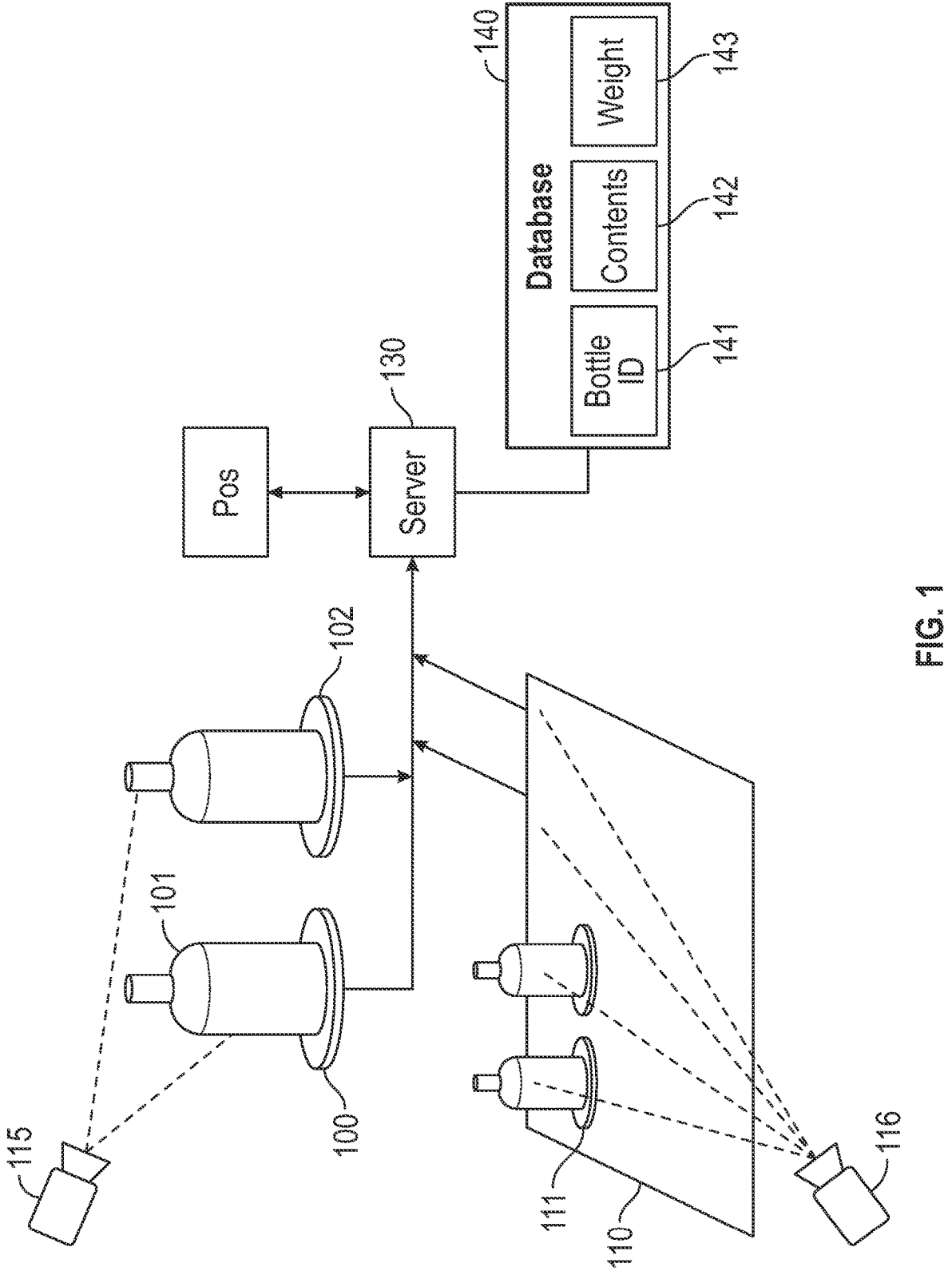
FIG. 1 shows a block diagram of a drink dispensing system.

An embodiment of the overall hardware used according to the present system is shown in FIG. 1.

The block diagram of FIG. 1 shows container weighing stations 100, 102, and a multiple weighing station 110. For simplicity, only these are shown, but it should be understood that many more stations may be expected. Each station such as 100 keeps and weighs a single container 101 using the techniques described in our previous patent application xxx. The containers contain liquid that is poured out of a bottle to serve to a user to pour a drink. When liquid is poured from the container, e.g, a bottle, to serve a drink, the reduced amount of liquid in the bottle causes a weight reduction. Each bottle such as 101 is stored on a scale and reader 100, which reads information from the liquor bottle 101.

The information read from the unique liquor bottle can be a unique identifier such as an RFID tag. The unique identifier is associated with the bottle weight and contents in a database 140.

In other embodiments, the unique identifier can include a barcode, or a hologram uniquely identifying the bottle, so that the identification and the bottle and its weight can be sent from each scale at each time to the server 150.

All locations where the bottles are located is also monitored by cameras, e.g, cameras 115, 116. In an embodiment, there are sufficient cameras to image and video every area which can store, or transport, or pour from liquor bottles. The information from the cameras and the scale and reader 100 is stored by a server 130 which operates as described herein.

The flowcharts shown in the figures can be carried out on one or more of the computers, and can be carried out on a cloud computing based system, or a distributed flowchart carried out using multiple different systems, for example individual users with phones or terminals such as point of sale system or comparable terminals having their apps carry out parts of the system operation which then communicate with a central database. Different parts of this invention can be used individually.

Each bottle typically arrives as part of a shipment of multiple bottles. As an initial step, the bottle is uniquely identified. In an embodiment, this can use an RFID tag that is affixed to the bottle. In an embodiment, there can be multiple different RFID tags, each with a unique address. These can be located in the stockroom in a sheet or roll of stickers that are manually or automatically affixed to the bottle when the bottle arrives in the stockroom. In other embodiments, this can use for example a QR code, which defines a unique ID, or can use some other form of identification. In an embodiment, the ID can be etched on to the bottle using a laser.

The specific contents of the bottle can be obtained. An embodiment can read universal product code or UPC of the bottle to find its contents. In another embodiment, the contents of the bottle can be determined from the camera obtaining information about the bottle contents and using an artificial intelligence algorithm to automatically determine the bottle contents by reading the printed on the bottle of the brand, alcohol type of the bottle, and its size.

When a UPC is used, The UPC brings up the bottle information about the specific contents of the bottle.

This forms a database 140 which is accessed and processed by the server. The database includes for each bottle, a unique bottle ID 141, information 142 indicative of the contents of that bottle, and the weight of the bottle 143. As described herein, the weight of the bottle will change over time.

In embodiments, each bottle is stored on a sensor such as 100. In an embodiment, the sensor weighs the bottle, and reads the RFID from an reader that is part of the sensor 100. In this way, whenever the bottle 101 is removed from the sensor, the sensor detects the weight go from a current weight to zero or close to zero. This weight change causes a lift event, where this detects the bottle being lifted from its sensor.

Similarly, when the bottle is replaced on the sensor, the weight goes from zero or close to zero, to a weight that includes its new and modified contents. This causes a replace event. After the replace event, the weight change between the weight before the lift event and the weight after the replace event is determined.

Each bottle is stored in a weighing and identifying location on a sensor. Sensors are shown herein as 100 or 110, however it should be understood that there can be many more systems, and any of a number of different systems can be used for this storage.

Figure 2:
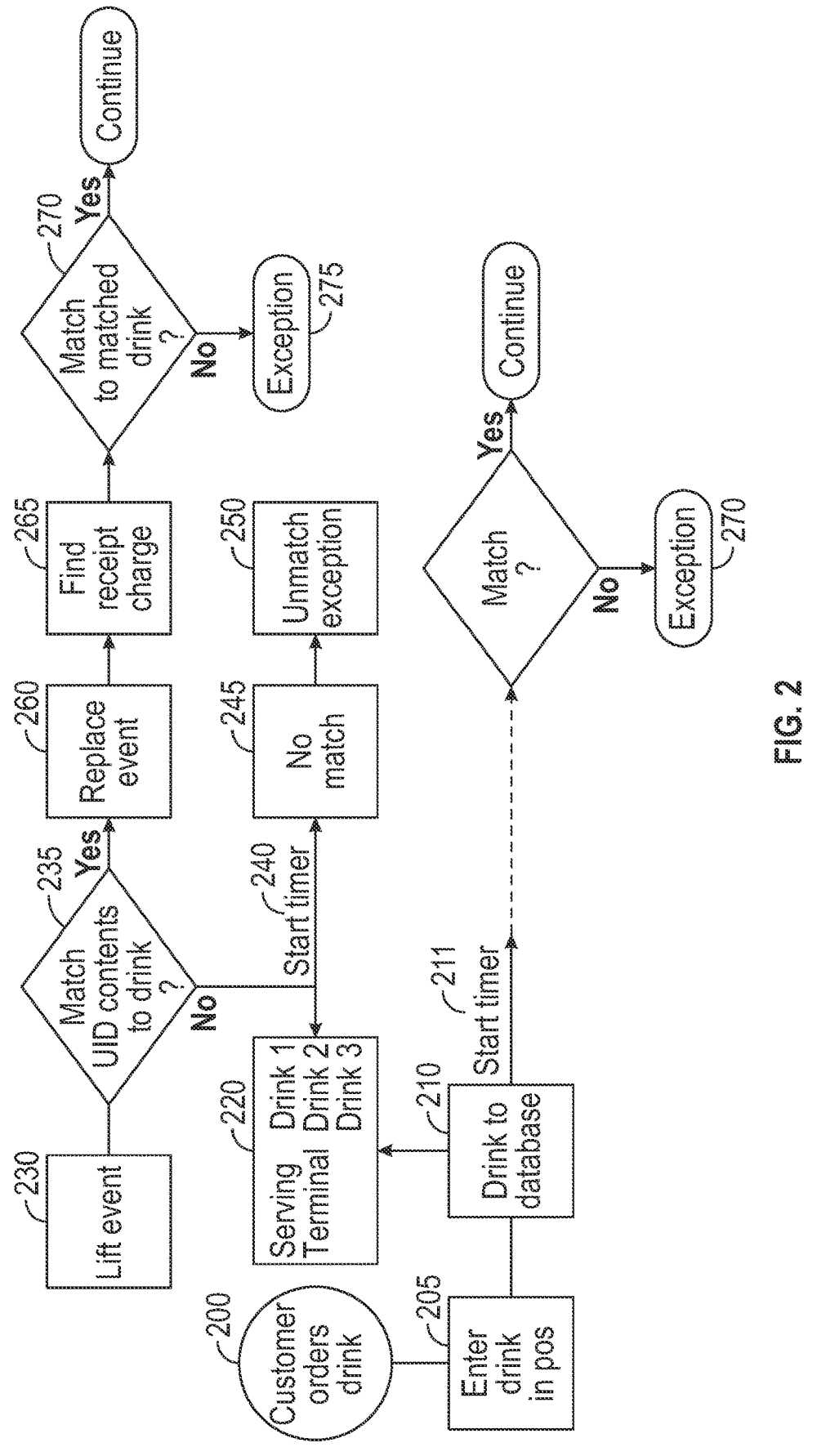
FIG. 2 shows computer programs that are run by one or more computers to effect the drink dispensing system.

The drink order and pour operation is carried out as shown in FIG. 2. The drink and pour operations as shown in FIG. 2 shows operations that are executed on a computer.

FIG. 2 operation starts at 200 where the customer orders a drink. The server receives the order, and enters the drink into the point-of-sale system at 205. The point-of-sale system enters the drink into the database at 210. The point-of-sale system also starts a pos timer shown as 211.

The database creates a list of drinks, shown as 220. This may be displayed to a drink dispenser, e.g., a bartender, in some way, or may produce paper tickets, or in some other way displayed to the person who is making the drinks.

In a more simple system, such as at a bar, the bartender may just make the drink when it is ordered, and there may be no display terminal.

The terminal or database includes a list of drink shown as drink 1, drink 2 and drink 3; although in general there could be only one drink or there could be many such drinks.

At 230, a lift event is detected. The lift event is when a bottle is removed from its sensor. The contents of the bottle are detected at 235, by matching the bottle's unique ID to its contents. The contents of the bottle are then matched to a drink that has been previously stored in the serving terminal, if there is a proper match.

If the UID is not matched to a drink, then a timer is started at 240. If no drink match is found at the end of the timer at 245 then an unmatched drink exception is declared at 250, indicating that a drink has been poured without a corresponding order.

When the bottle is replaced on the sensor, a replace event occurs at 260. The replace event indicates that the bottle has been put back. At this point, the weight change 265 is detected, which is the weight change for the drink. This is matched at 272 the specific drink, here drink 2. For example, if drink 2 was for a well vodka based drink, then the weight change at 265 should be a single shot weight change for a well vodka. If the weight change at 265 does not match to the order, then an exception is declared at 275 The exception at 275 may be additional to the exception for other exceptions.

In an embodiment, a drink pouring employee (bartender) can select an order to indicate that it is being poured, or the order otherwise comes into focus of the employee. For example, there can be many drinks on the terminal, and the top order can automatically be in focus. The top order will thus automatically be associated with the current actions of the server unless the server takes some other action in order to show that some other order is being poured. The server can select a different order, making that order become the order under action.

Other embodiments can automatically match the order to the poured drink.

In this embodiment, any time an exception is declared, video footage from the cameras in the area of the exception are associated with the exception. All of the video footage from every camera that was facing the inventory receiving is saved, and associated with this exception. This allows a supervisor or other person reviewing the exception later after it has occurred, to receive the video as part of the exception, to determine how the exception was caused. Exceptions as described herein can be caused by lift events that are not associated with orders, orders that do not get subsequent lift events and subsequent weight reductions, excessive weight reductions for the order that was placed, or the wrong material being poured for the order that was placed.

in certain embodiments, such as when this is used by a bartender at a bar, there may be a single order made to a single drink pouring individual, and the single order is then matched to a pour event caused by a lift event, followed by a replace event.

However, this may not be practical in a busy bar situation. In a busy bar situation, the bartender may receive multiple orders and once, and may also pour multiple drinks at one time.

Figures 3, 4:
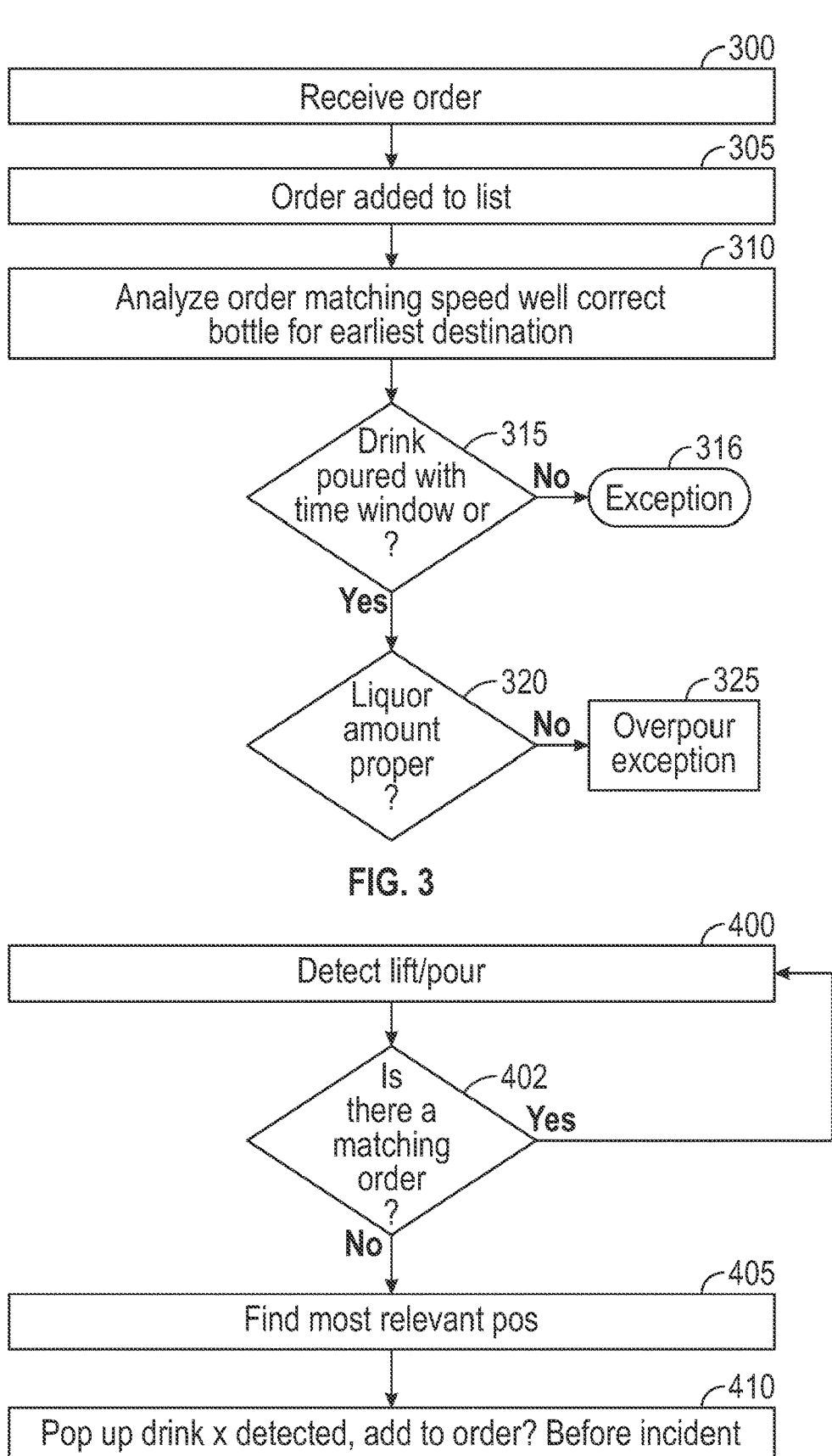
FIG. 3 shows a flowchart of order matching.
FIG. 4 shows an automatic drink adding flowchart.

FIG. 3 illustrates how orders are matched to events, which can be key in a busy bar situation. An order is received at 300, and added to the list of open orders at 305. In a busy bar, there many be there may be many such orders, and hence there may be a waiting period before the drink is poured after the order has been made. There can also be many different orders displayed to the bartender at any given moment.

When a lift event is detected, at 310, the system analyzes which bottle was lifted and poured, and then analyzes the list created at 305 to find the earliest order in the order list for that same bottle contents.

If this matches, then the order previously received is matched to the drink when it is later poured, and detected via the lift event and replace event, followed by the weight reduction.

If the lift and replace weight reduction event does not match to an order in the list, or matches to an order which is out of sync, then an exception is reported at 316. The order can be too old (e.g., more than 15 minutes old) or otherwise unmatched to the pour event.

If the drink is poured within the time window, then 320 determines if the amount of liquor that was poured is appropriate to the order. If not, an overpour exception is declared at 325. If the drink is not poured within the time window or direction at 315, then a general exception is declared at 316.

In an embodiment described above, the order matching is carried out according to the earliest order of the same material/liquor that is poured. However, the order matching can also be carried out or can include a destination. In this embodiment, when the customer orders a drink at 200, and the drink is entered into the database, it also includes either a destination such as a table number, or a server indication such as a server number. In this embodiment, the order matching finds not the correct bottle for the earliest order, but rather the correct bottle for the destination match.

FIG. 4 shows an automatic add to order embodiment. This embodiment may be used in any kind of bar situation. In a single bartender/order person embodiment, the bartender need only carry out the lift event to add the item to the order. In a more busy bar event, when the bartender lifts the item, and it cannot be matched to an order, then the bartender is prompted to add this to the order.

At 400, the system detects a lift event. 402 detects if there is a matching order, using any of the techniques described herein, or any other technique of matching to an order. If there is a matching order, flow discontinues. If not, at 405, the system finds the most relevant point of sale device. This may be, for example, the closest point-of-sale to the lift event, which may be the server who is closest to the bottle that was lifted. Alternatively, the most relevant point-of-sale may be that associated with the server who is taking the most orders. The most relevant point-of-sale can be determined by artificial intelligence techniques to determine who is most likely to be the server taking the orders that was not entered not the POS.

At 410, the system pops up on the point-of-sale of the most relevant terminal, that drink X has been determined. This is done by detecting from the lift event, which alcoholic beverage has been lifted, and in the case of an actual poor detects how much of the alcohol has been poured. This can automatically form an order or drink to be added to an order. At 410, this pops up a message that drink X has been detected, and asks if drink X can be added to a new or existing order.

This operation can be carried out before an exception or incident is detected or did established in any of the other flowcharts. This also provides the server an opportunity to add this to the order, more easily since it is automatically populated specifically what has been served, and also minimizes the number of exceptions which are declared.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An order maintaining system, comprising:

a first computer which receives orders which are placed by customers for items for sale, the items for sale including drinks which are poured by a drink server, where the first computer includes a point of sale system;

the first computer storing a database of drinks which have been received on the first computer, the database of drinks including the orders and at least multiple drinks that have a first material content, where the database of drinks includes multiple unpoured drinks, where the multiple unpoured drinks have been ordered by the customers but not yet poured by the drink server;

a container sensing device, which detects a unique identifier that is uniquely indicative of each of a plurality of containers, and automatically detects a weight of a container when the container is on the container sensing device, the container sensing device being connected to the first computer;

the first computer operating to detect a lift event when a first container is removed from the container sensing device, and to detect a unique ID of the first container that was lifted, and to determine, from the database, based on the unique ID, contents of the first container that was lifted;

the first computer further operating to determine a matching drink to the contents of the first container that was lifted, in the multiple unpoured drinks that have been ordered by the customers but not yet poured by the drink server in the database of drinks, and where the first container that was lifted includes the first material content, and wherein there are multiple of the multiple unpoured drinks that have a same first material content, and the matching drink is determined by finding an earliest in time order of the first material content among the multiple unpoured drinks in the database of drinks, and matching the earliest in time order among the multiple unpoured drinks to a drink being poured by the first container being lifted;

the first computer operating to detect a replace event when the first container that has been lifted is replaced on the container sensing device, to detect the unique ID of the first container that is replaced, and to determine a weight difference from the database between a weight when the first container was lifted and a weight when the first container was replaced, and to determine if the weight difference matches to the matching drink; and the first computer operating to find a point of sale computer located closest to a location of the lift event to receive a new order when the orders in the database of drinks do not match the contents of the first container that was lifted, to form the new order, and to send the new order to the point of sale computer.

2. The ordering maintaining system as in claim 1, further comprising a plurality of monitoring cameras, monitoring areas where all the containers are stored.

3. The ordering maintaining system as in claim 1, wherein the first computer forming a matching order for a specific drink if the first computer cannot detect the matching order in the multiple unpoured drinks in the database of drinks, and popping up information indicating contents of the matching order on the point of sale system as an order to be added to the point of sale system, where the matching order is for the specific drink that has been poured, and is detected by the weight difference between the first container when it is lifted and the first container when it is replaced.

4. The ordering maintaining system as in claim 1, wherein the first computer operates to determine the matching drink by finding a drink that has been ordered in the database of drinks, that has the same contents as the first container that was lifted in the lift event.

5. The ordering maintaining system as in claim 1, further comprising starting a timer responsive to the lift event if the first computer cannot detect the matching drink in the database.

6. The ordering maintaining system as in claim 1, wherein if the weight difference represents more than an amount of drink specified in the order, then an exception is determined.

7. An order maintaining system, comprising:

a first computer which receives orders which are placed by customers for items for sale, the items for sale including drinks which are poured by a drink server, where the first computer includes a point of sale system;

the first computer storing a database of drinks which have been ordered, where the database of drinks includes the orders and multiple unpoured drinks, where the multiple unpoured drinks have been ordered by the customers but not yet poured by the drink server;

a container sensing device, which detects a unique identifier that is uniquely indicative of contents of each container, and automatically detects a weight of a container when the container is on the container sensing device, the container sensing device being connected to the first computer;

the first computer operating to detect a lift event when a first container is removed from the container sensing device, and to detect a unique ID of the first container that was lifted, and to determine, from the database, based on the unique ID, contents of the first container that was lifted;

the first computer further operating to determine a matching drink to the contents of the first container that was lifted, in the multiple unpoured drinks among the database of drinks;

the first computer operating to detect a replace event when the first container that has been lifted is replaced on the container sensing device, to detect the unique ID of the first container that is replaced, and to determine a weight difference from the database between a first weight when the first container was lifted and a second weight when the first container was replaced, and to determine if the weight difference matches to the matching drink, the first computer forming a matching order for a specific drink if the first computer cannot detect the matching order in the multiple unpoured drinks in the database of drinks, and popping up information indicating contents of the matching order on the point of sale system as an order to be added to the point of sale system, where the matching order is for the specific drink that has been poured, and is detected by the weight difference between the first container when it is lifted and the first container when it is replaced; and the first computer operating to find a point of sale computer located closest to a location of the lift event to receive a new order when the orders in the database of drinks do not match the contents of the first container that was lifted, to form the new order, and to send the new order to the point of sale computer.

8. The ordering maintaining system as in claim 7, wherein there are multiple of the multiple unpoured drinks that have a same first material content, and the matching drink is determined by finding an earliest in time order of the first material content among the multiple unpoured drinks in the database of drinks.

9. The ordering maintaining system as in claim 7, wherein the first computer includes multiple different ordering point of sale computers, and wherein the first computer operates to find a most relevant point of sale computers as a most relevant computer to receive the order, and to send the matching order formed by the first computer to the most relevant one of the point of sale computers.

10. The ordering maintaining system as in claim 9, wherein the most relevant computer is a point of sale computer that has made the most orders and the first computer sends the matching order formed by the first computer to the point of sale computer that has made the most orders.

* * * * *